US006934737B1

(12) United States Patent
Tang et al.

(10) Patent No.: US 6,934,737 B1
(45) Date of Patent: Aug. 23, 2005

(54) METHOD AND APPARATUS FOR PROVIDING MULTI-LEVEL ACCESS CONTROL IN A SHARED COMPUTER WINDOW

(75) Inventors: John C. Tang, Palo Alto, CA (US); Nicole Y. Mordecai, Weston, MA (US); James M. A. Begole, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/577,223

(22) Filed: May 23, 2000

(51) Int. Cl.[7] .............................................. G06F 15/16
(52) U.S. Cl. ....................... 709/204; 709/219; 719/310; 719/329
(58) Field of Search .......................... 709/204, 219, 709/310, 329; 719/310, 329

(56) References Cited

U.S. PATENT DOCUMENTS

| 5,838,300 | A | | 11/1998 | Takagi et al. ............... 345/145 |
| 5,949,975 | A | * | 9/1999 | Batty et al. ................. 709/213 |
| 6,061,717 | A | | 5/2000 | Carleton et al. ............ 709/205 |
| 6,085,227 | A | * | 7/2000 | Edlund et al. .............. 709/203 |
| 6,101,607 | A | * | 8/2000 | Bachand et al. ............ 713/201 |
| 6,189,032 | B1 | * | 2/2001 | Susaki et al. ............... 709/225 |
| 6,223,212 | B1 | * | 4/2001 | Batty et al. ................. 709/204 |
| 6,389,543 | B1 | * | 5/2002 | Dawson et al. ............. 713/202 |
| 6,574,656 | B1 | * | 6/2003 | Nagaoka et al. ............ 709/201 |
| 6,584,493 | B1 | * | 6/2003 | Butler ........................ 709/204 |

FOREIGN PATENT DOCUMENTS

EP 0 472 839 A2 6/1991

OTHER PUBLICATIONS

HongHai Shen and Prasun Dewan, "Access Control for Collaborative Environment," Nov. 1992, CSCW 92 Proceedings, 51-58.*

* cited by examiner

Primary Examiner—Meng-Al T. An
Assistant Examiner—Li Zhen
(74) Attorney, Agent, or Firm—Park, Vaughan & Fleming LLP

(57) ABSTRACT

One embodiment of the present invention provides a shared window into which a remote user can input commands from a remote computer system subject to access control. The system operates by receiving a command from the remote user on the remote computer system, wherein the command is directed toward the local computer system in order to operate the local computer system. If the command passes a filtering process, the system executes the command to a local operating system so that the command can operate on the local computer system. The system also displays the command on the shared window on the local computer system so that a local user can view the command. The system additionally allows the command to be displayed on a remote copy of the shared window on the remote computer system, so that the remote user can view the command. In one embodiment of the present invention, if the shared window is in an approval mode, the filtering process involves allowing the local user to approve the command. If the local user approves the command, the system allows the command to pass the filtering process.

33 Claims, 7 Drawing Sheets

METHOD AND APPARATUS FOR PROVIDING MULTI-LEVEL ACCESS CONTROL IN A SHARED COMPUTER WINDOW

BACKGROUND

1. Field of the Invention

The present invention relates to remotely controlling computer systems. More specifically, the present invention relates to a method and an apparatus for controlling access in a shared window (shared shell) for entering commands into a computer system, which can be shared by multiple participants from remote locations who can input data into the shared window.

2. Related Art

As computer systems grow increasingly more complicated, it is becoming increasingly harder to diagnose and resolve computer system problems. Upon encountering a problem that cannot be easily resolved, a computer user typically makes a telephone call to a system administrator or a support engineer in order to receive assistance. During such a telephone call, the support engineer typically dictates arcane operating system commands to the computer user, and the computer user reads back the resulting output from these commands. Such communication is complicated by problems such as noisy server rooms and language accents. Furthermore, if the problem is complicated enough, the system administrator may require assistance from an additional engineer, who is possibly located at a different location.

A number of systems have been developed to deal with this remote support problem. These existing systems typically allow a remote user to view a window for entering data into local computer system from a remote computer system. These existing systems may also allow the external user to enter commands into the computer system from the remote computer system.

However, computer users are often very sensitive about allowing a person outside their organization to have unrestricted access to a computer within their organization. Once the external user is given the ability to enter commands into the local computer system, the external user may be able to access sensitive information and can potentially cause damage to the local computer system. In existing remote support systems, the ability of the external user to compromise security can be limited only by not allowing the external user to enter any commands into the local computer system. Unfortunately, in this restricted mode of operation, the external user must communicate the commands to the computer user over the telephone with all of the associated-difficulties in communication.

What is needed is a method and an apparatus for allowing an external user to enter commands into a local computer system while in some way limiting the extent to which the commands can be entered.

SUMMARY

One embodiment of the present invention provides a shared window that allows a remote user to input commands into a local computer system from a remote computer system subject to access control. The system operates by receiving a command from the remote user on the remote computer system, wherein the command is directed toward the local computer system in order to operate the local computer system. If the command passes a filtering process, the system submits the command to the local operating system so that the command can execute on the local computer system. The system also displays the command on the shared window on the local computer system so that a local user can view the command. The system additionally allows the command to be displayed on a remote copy of the shared window on the remote computer system, so that the remote user can view the command.

Note that the term "local user" as used in this specification refers to a person who controls a machine on which a command is to be executed. This machine is referred to as the "local machine." The term "remote user" refers to a person, typically operating from a remote machine, who is invited to join in entering commands into the local machine.

In one embodiment of the present invention, if the shared window is in a view-only mode, the system does not allow commands received from the remote user to pass the filtering process.

In one embodiment of the present invention, if the shared window is in an approval mode, the filtering process involves allowing the local user to approve the command. If the local user approves the command, the system allows the command to pass the filtering process.

In one embodiment of the present invention, if the shared window is in an execute mode, the system allows all commands received from the remote user to pass the filtering process.

In one embodiment of the present invention, if the shared window is in a safe command mode, the system allows only commands from a pre-specified list of safe commands to pass the filtering process.

In one embodiment of the present invention, commands from different users appear in different colors on the shared window.

In one embodiment of the present invention, allowing the command to be displayed on the remote computer system involves sending an update for the shared window from the local computer system to the remote computer system, wherein the update includes the command.

In one embodiment of the present invention, the system additionally receives a second command from a second remote user on a second remote computer system.

In one embodiment of the present invention, the filtering process takes place on at least one of, the remote computer system, the local computer system and a shared server that is separate from the remote computer system and the local computer system.

In one embodiment of the present invention, the command is in the form of character input.

In another embodiment of the present invention, the command is in the form of an action applied to a graphical user interface.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer Systems

Figure 1:
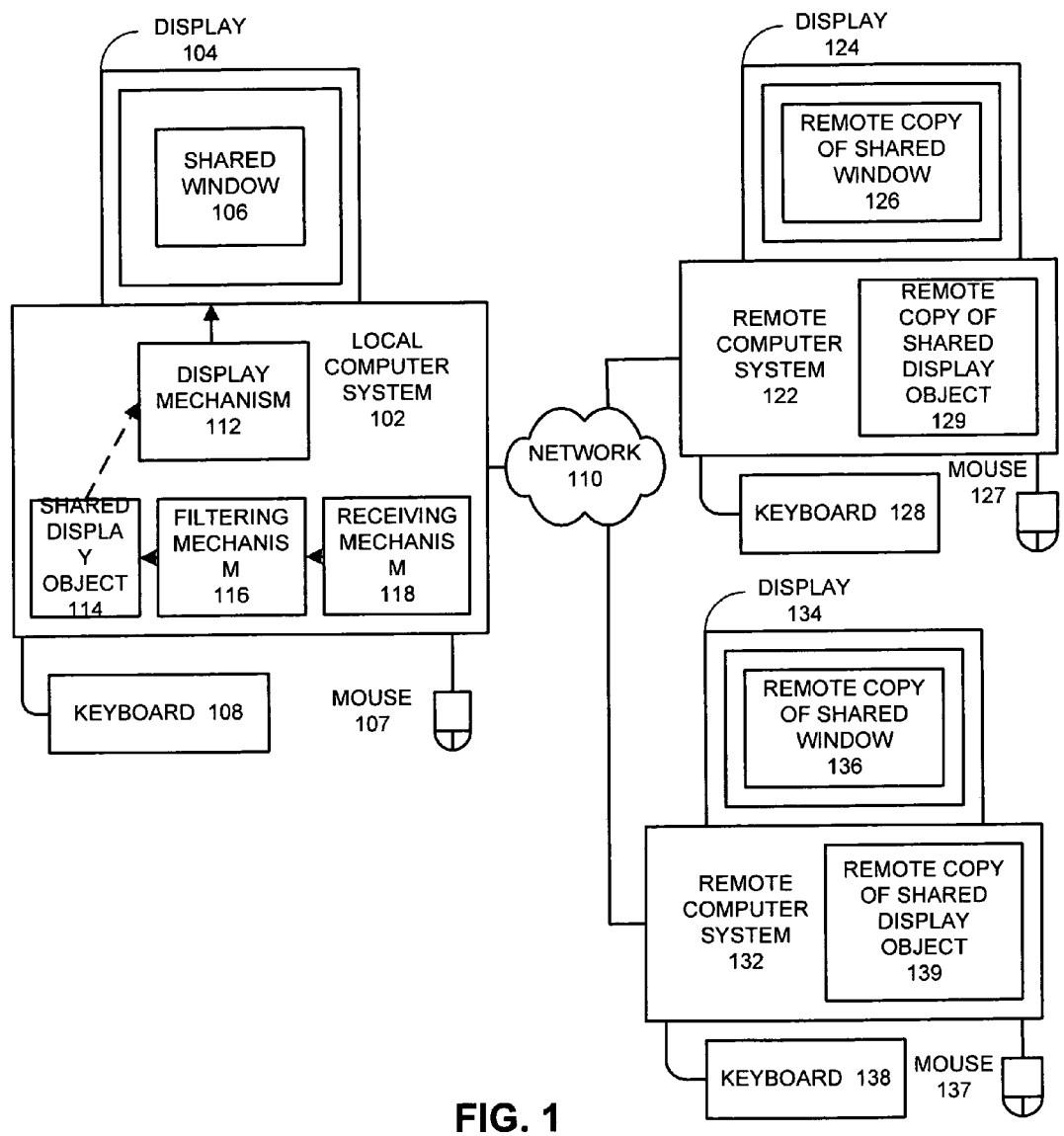
FIG. 1 illustrates a local computer system coupled to remote computer systems through a network in accordance with an embodiment of the present invention.

FIG. 1 illustrates a local computer system 102 coupled to remote computer systems 122 and 132 through a network 110 in accordance with an embodiment of the present invention.

Network 110 can include any type of wire or wireless communication channel capable of coupling together computing nodes. This includes, but is not limited to, a local area network, a wide area network, or a combination of networks. In one embodiment of the present invention, network 110 includes the Internet.

Local computer system 102 and remote computer systems 122 and 132 can include any type of computer system, including, but not limited to, a computer system based on a microprocessor, a mainframe computer, a digital signal processor, a personal organizer, a device controller, and a computational engine within an appliance.

Computer systems 102, 122 and 132 include displays 104, 124 and 134, respectively, for displaying output. Display 104 in local computer system 102 includes shared window 106. Similarly, displays 124 and 134 for remote computer systems 122 and 132 include remote copies 126 and 136 of the shared window 106. Computer systems 102, 122 and 132 also include keyboards 108, 128 and 138, as well as mice 107, 127 and 137, for entering input into computer systems 102, 122 and 132.

Note that local computer system 102 contains shared display object 114, which includes data structures associated with shared window 106. Similarly, remote computer systems 122 and 132 include remote copies 129 and 139 of the shared display object 114, including data structures associated with remote copies 126 and 136 of shared window 106.

Local computer system 102 also includes display mechanism 112, filtering mechanism 116 and receiving mechanism 118. Receiving mechanism 118 receives commands from remote users on remote computer systems 122 and 132. Filtering mechanism 118 selectively filters the received commands depending upon the access mode of the system. (Note that filtering may additionally take place prior to sending the commands from remote computer systems 122 and 132.) Finally, display mechanism 112 displays shared window 106 based upon the contents of shared display object 114.

The system illustrated in FIG. 1 operates generally as follows. A remote user on remote computer system 122 sends a command across network 110 to local computer system 102. Receiving mechanism 118 receives the command and passes it through filtering mechanism 116.

If the command passes the filtering process, the command is used to modify shared display object 114, which causes shared window 106 to be modified to include the command. The changes to shared display object 114 are also propagated to remote copies 129 and 139 of the shared display object 114 in order to update remote copies 126 and 136 of shared window 106. The command is also sent to the operating system of local computer system 102.

Note that if a command originates from a local user, the command is displayed on shared window 106 and the command is executed normally, as it would have been if entered into a non-shared window on local computer system 102.

Display Mechanism

Figure 2:
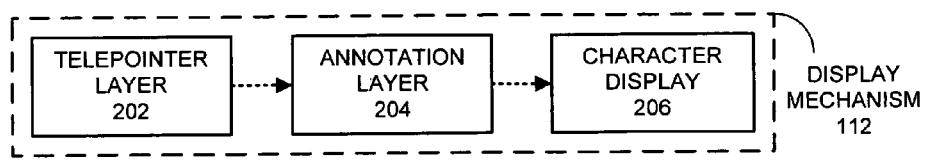
FIG. 2 illustrates the internal structure of a display mechanism in accordance with an embodiment of the present invention.

FIG. 2 illustrates the internal structure of display mechanism 112 in accordance with an embodiment of the present invention. Display mechanism 112 includes a number of layers, including character display 206, annotation layer 204, and telepointer layer 202. Character display 206 is used to display characters within shared window 106. Annotation layer 204 is used to display marks or annotations made by various participants to a shared window conference involving shared window 106. These annotations can be made with drawing tools that are part of shared window 106 in accordance with an embodiment of the present invention. Telepointer layer 202 is used to display cursors for various participants in a shared window conference.

Processing a Command Received from a Remote Computer System

Figure 3:
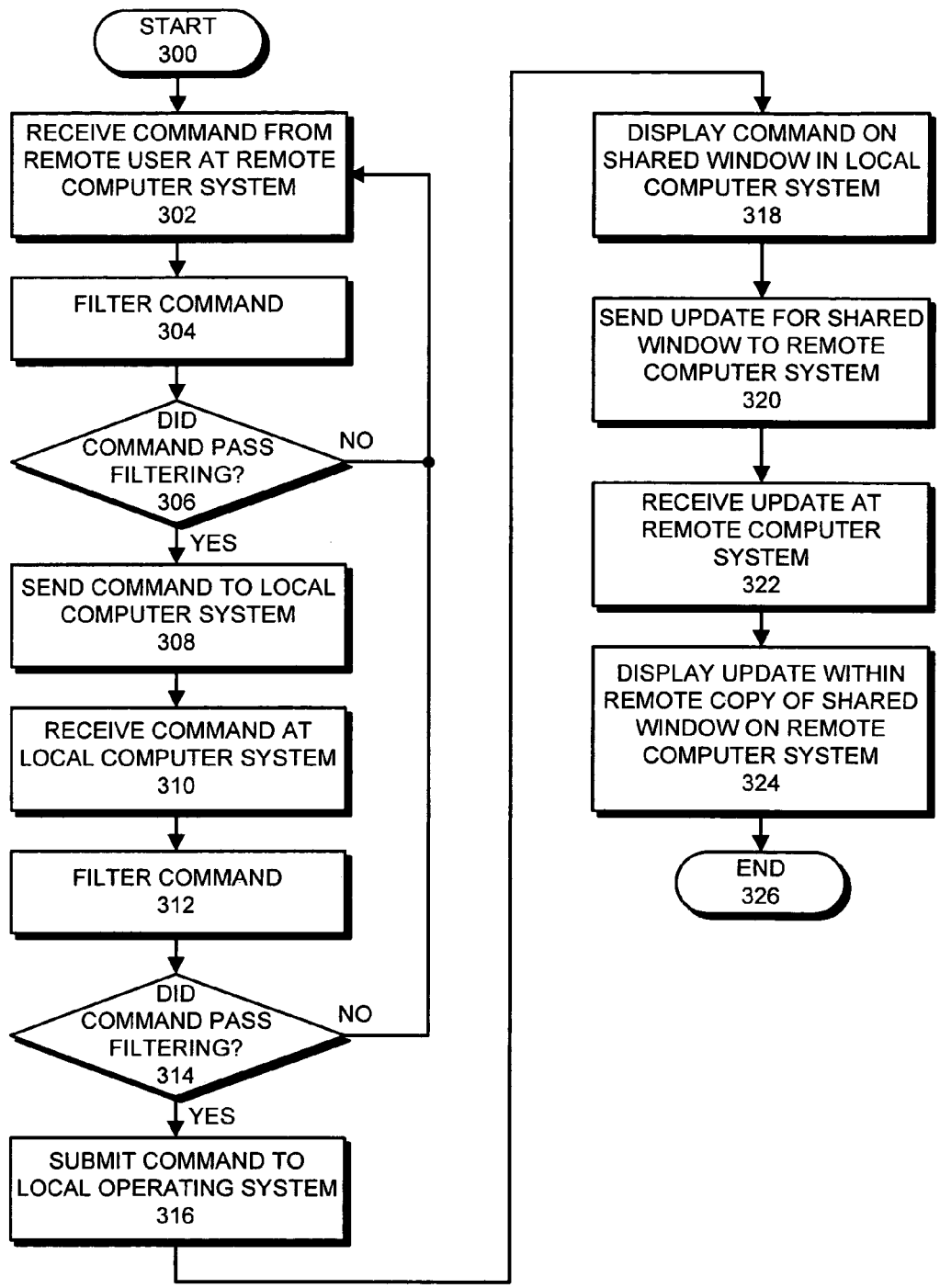
FIG. 3 is a flow chart illustrating the processing of a command received from a remote computer system in accordance with an embodiment of the present invention.

FIG. 3 is a flow chart illustrating the processing of a command received from a remote computer system 122 in accordance with an embodiment of the present invention. The system starts by receiving a command directed to shared window 106 from a remote user at remote computer system 122 (step 302). This command is filtered at remote computer system 122 (step 304). This filtering process is described in more detail below with reference to FIG. 4. If the command passes the filtering process, it is sent across network 110 to local computer system 102 (step 308). If the command does not pass the filtering process, the system returns to step 302 to receive another command.

Next, the command is received at local computer system 102 (step 310), and is again filtered (step 312). If the command passes this second filtering process, the command is executed on the operating system of local computer system 102 (step 316). Otherwise, the system returns to step 302 to receive an additional command.

If the command passes the filtering process, the command is submitted to local computer system 102, and the command is also displayed on shared window 106 within local computer system 102 (step 318). This is accomplished by using the command to update shared display object 114 (see FIG. 1), and then using display mechanism 112 to display the updated shared display object 114 to shared window 106.

Next, the system sends corresponding updates for shared window 106 to remote computer systems 122 and 132 (step 320). Upon receiving these updates (step 322), remote computer systems 122 and 132 display these updates by applying the updates to remote copies 129 and 139 of shared display object 114, and then outputting the corresponding data to remote copies 126 and 136 of shared window 106 (step 324).

Process of Filtering a Command

Figure 4:
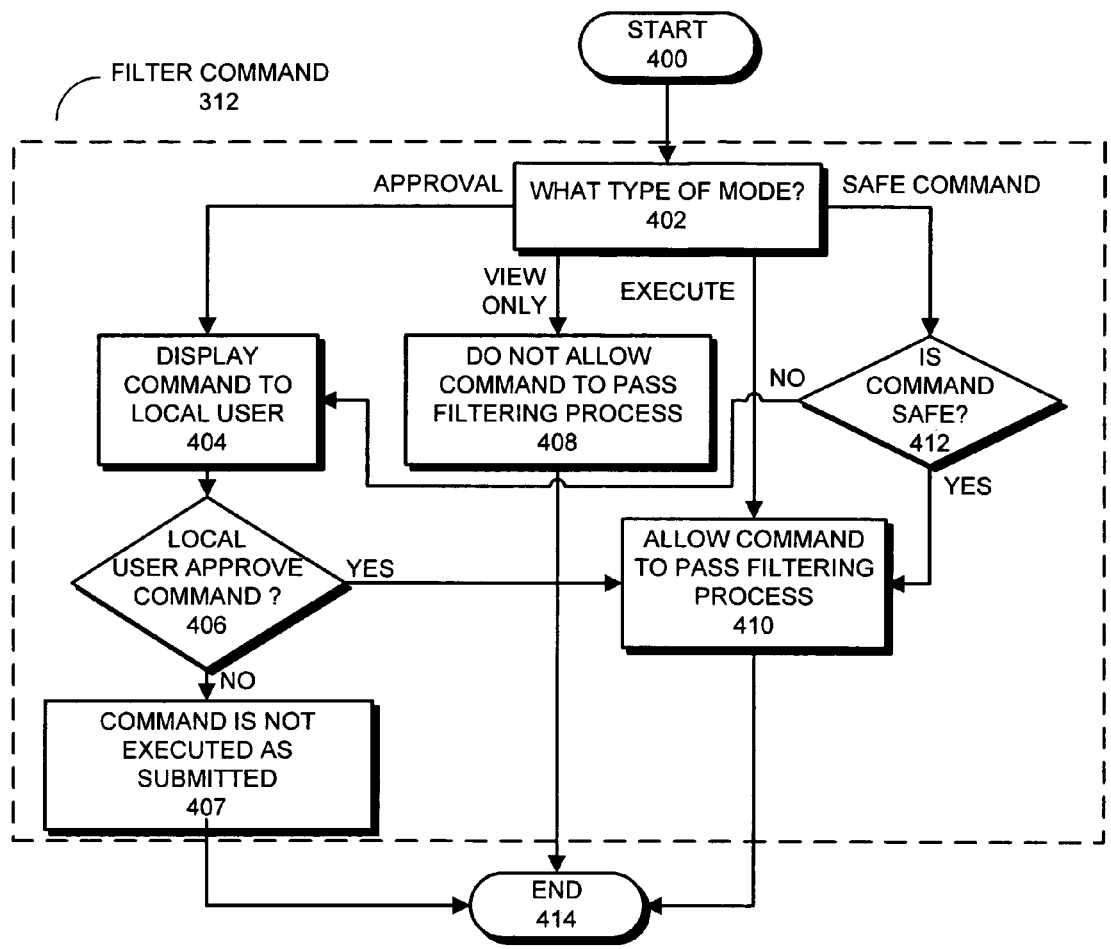
FIG. 4 is a flow chart illustrating the process of filtering a command in accordance with an embodiment of the present invention.

FIG. 4 is a flow chart illustrating the process of filtering a command in accordance with an embodiment of the present invention. This flow chart illustrates in more detail the process carried out in steps 304 and 312 from FIG. 3. The system first determines which mode (or access type) the shared window 106 is in (step 402).

If shared window 106 is in an "approval" mode, the system displays the command to the local user (step 404). Next, the system allows the local user to approve the command (step 406).

In one embodiment of the present invention, this is accomplished by allowing the remote user to enter characters that do not cause a command to be executed to pass through the filtering process. When a character that causes a command to be executed is entered by the remote user (such as a carriage return) the system sends a special message from the remote computer system 122 to local computer system 102. This special message causes local computer system 102 to ask the local user if the carriage return can be entered. This can be accomplished by displaying a blinking carriage return label at the end of a command line in shared window 106, and by displaying a message in a status bar 804 (see FIG. 8).

At this point, the local user is able to view the contents of the command line to see if it is a command that the local user would like to approve. If so, the local user can enter a carriage return to submit the command. If the local user or any other user enters an additional character that is not a carriage return (such as a backspace), the command is not approved. In this case, the blinking carriage return disappears, and the command is not submitted as executed (step 407). Furthermore, the additional character is appended to the command line in shared window 106. At this point, the local user (or any remote user) is able to add to the command or edit the command by providing additional keyboard input.

If the local user approves the command, the system allows the command to pass the filtering process (step 410).

If shared window 106 is in "view-only" mode, the system does not allow any commands that are entered by the remote user to pass through the filtering process (step 408). Hence, in view-only mode, the remote user is only able to view shared window 106, and is not allowed to enter any commands into shared window 106.

If shared window 106 is in "execute" mode, the system allows all commands that are entered by the remote user to pass the filtering process (step 410). Hence, the remote user is able to enter commands into shared window 106 without approval by the local user or without any other type of filtering.

If shared window 106 is in a "safe command" mode, the system determines if the command entered by the remote user belongs to a list of "safe" commands that do not harm the computer system (step 412). For example, a command that list the files within a directory can be considered a safe command, whereas a command that erases a file can be considered an unsafe command. Alternatively, commands that can be undone can be considered "safe" commands, whereas commands that cannot be undone can be considered unsafe commands.

If the command is a safe command, the system proceeds to step 410 where the command is allowed to pass the filtering process. If the command is an unsafe command, the system proceeds to step 404 and the system displays the command to the local user. If the local user approves the command, the system allows the command to pass the filtering process (step 406).

In another embodiment of the present invention, the command is received in the form of an action applied to the graphical user interface (such as a pressing of a button in the graphical user interface). For example, if shared window 106 is in an "approval" mode and a button in shared window 106 is pressed by a remote user, the button flashes to indicate that approval by the local user is required. There may also be a text message specifying the approval is required. If the local user presses the button, the command is allowed to proceed. Otherwise, the local user can cancel the command by entering some other type of input, or by explicitly canceling the command.

Windows

Figure 5:
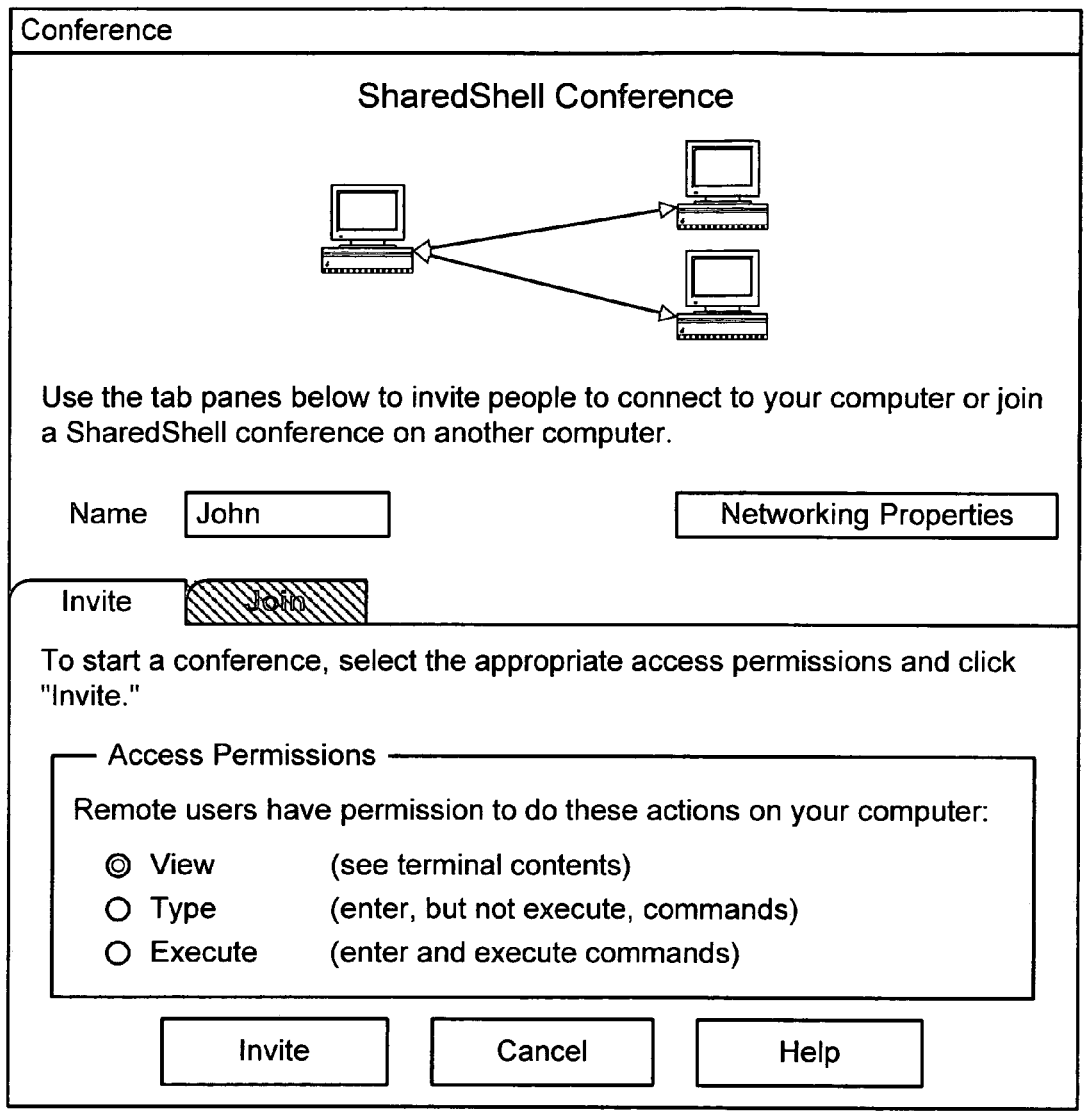
FIG. 5 illustrates a window for inviting remote users to join a conference in accordance with an embodiment of the present invention.

FIG. 5 illustrates a window for inviting remote users to join a shared window conference in accordance with an embodiment of the present invention. The local user initiates a shared window conference by inviting other people to share in shared window 106. When the shared window application starts, a conference dialog box appears with the "invite" tabbed pane selected. The local user may make any desired changes to the name field, although the shared window application tries to automatically detect the user's first name.

Next, the local user selects the appropriate access permission setting, choosing among the following three options: (1) view-mode allows remote users to see terminal contents; (2) approval-mode allows remote users to enter, but not execute commands (the local user must press carriage return to execute the command); and (3) execute-mode allows remote users to enter and execute commands.

Figure 6:
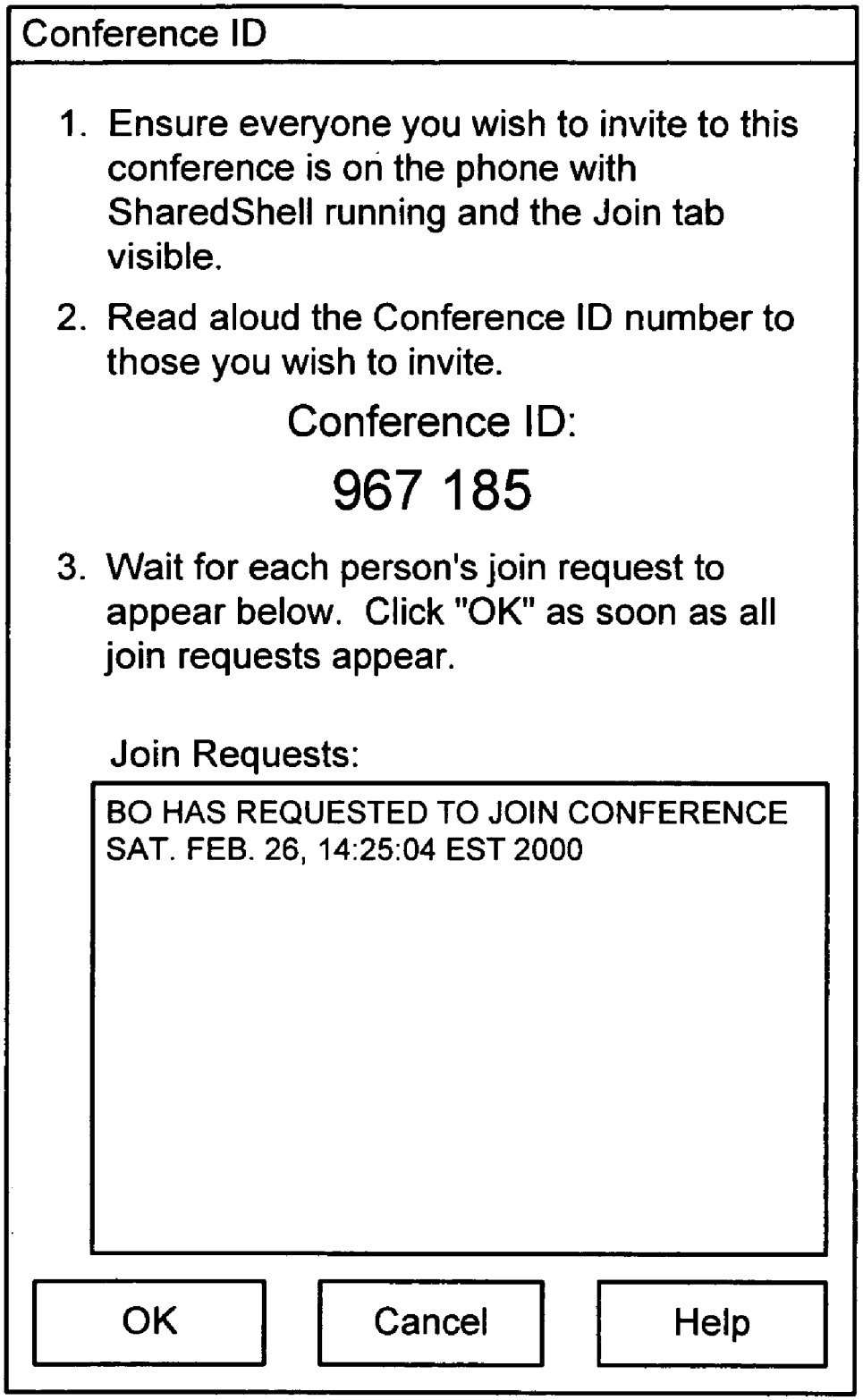
FIG. 6 illustrates a dialog box for displaying a conference identifier in accordance with an embodiment of the present invention.

Once the local user makes selections and clicks on "invite," the conference dialog box is replaced with the conference ID dialog box see FIG. 6.

At this point, the local user reads the conference ID displayed in the conference ID dialog box aloud to everyone involved in the shared window conference over the telephone. This conference ID helps to ensure that the shared window connection remains secure and private, and is only valid while this dialog box is open. If the dialog box is accidentally left open, the conference ID times out after several minutes.

When remote users enter the conference ID into the interface, the conference ID window is updated to identify the users that have joined the conference.

Once the local user detects that the remote user has joined, and that there are no unauthorized intruders, he clicks on the "OK" button. At this point, all participants in the conference see shared window 106, which is described in more detail below with reference to FIG. 8.

Figure 7:
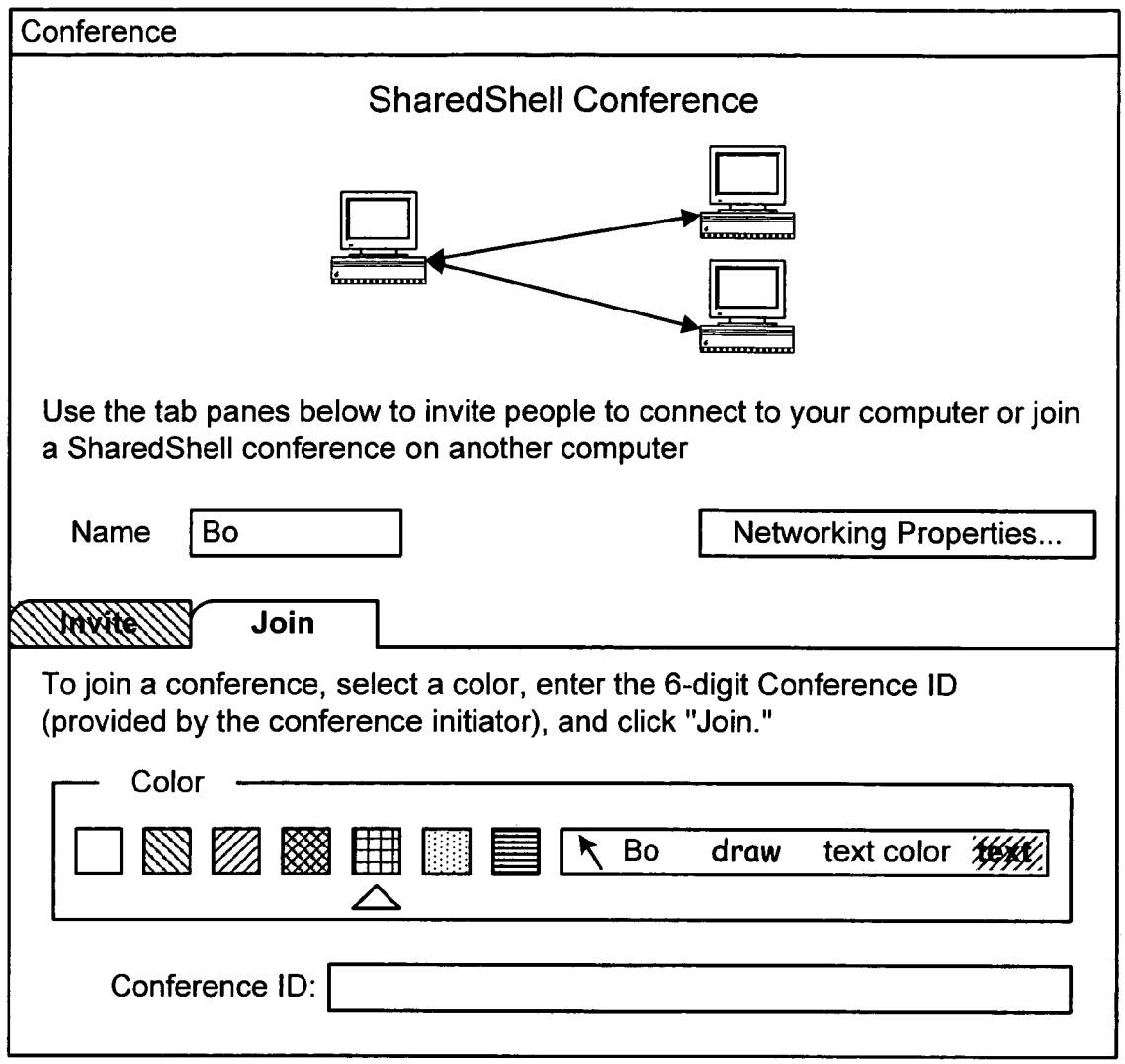
FIG. 7 illustrates a window that allows a remote user to join a conference in accordance with an embodiment of the present invention.

From the remote user's side, the remote user launches a shared window or uses an existing shared window to bring up a conference dialog box (see FIG. 7). To connect to shared window 106 on local computer system 102, the remote user clicks on the "Join" tab in the conference dialog box. The remote user can also select what color to use for the remote user's telepointer and drawing. At this point, the remote user waits for the local user to read aloud the conference ID. Upon hearing the conference ID, the remote user enters it into the "conference ID" field and clicks on "join." The conference dialog box disappears and once the local user confirms that the remote user is the right person to join the conference, the local user starts the conference.

The local user can also work within shared window 106 before inviting anyone to join a conference. For example, if the local user is experiencing an intermittent problem, the local user might want to first get the problem to occur before calling the remote user for technical support. To do this, after starting shared window 106, the local user cancels the conference dialog box. At this point, shared window 106 becomes active and able to execute operating system commands, but is not connected with any other remote users. In this active-but-unconnected mode, shared window 106 behaves like an ordinary, single-user terminal window.

Once the local user re-creates the problem, the local user can invite the remote user join a shared window conference. When the remote user joins, the remote user can see the history of commands that the local user executed when the local user was working on the problem in single-user mode. This allows them to collaboratively review the commands that were executed before the conference was started.

Figure 8:
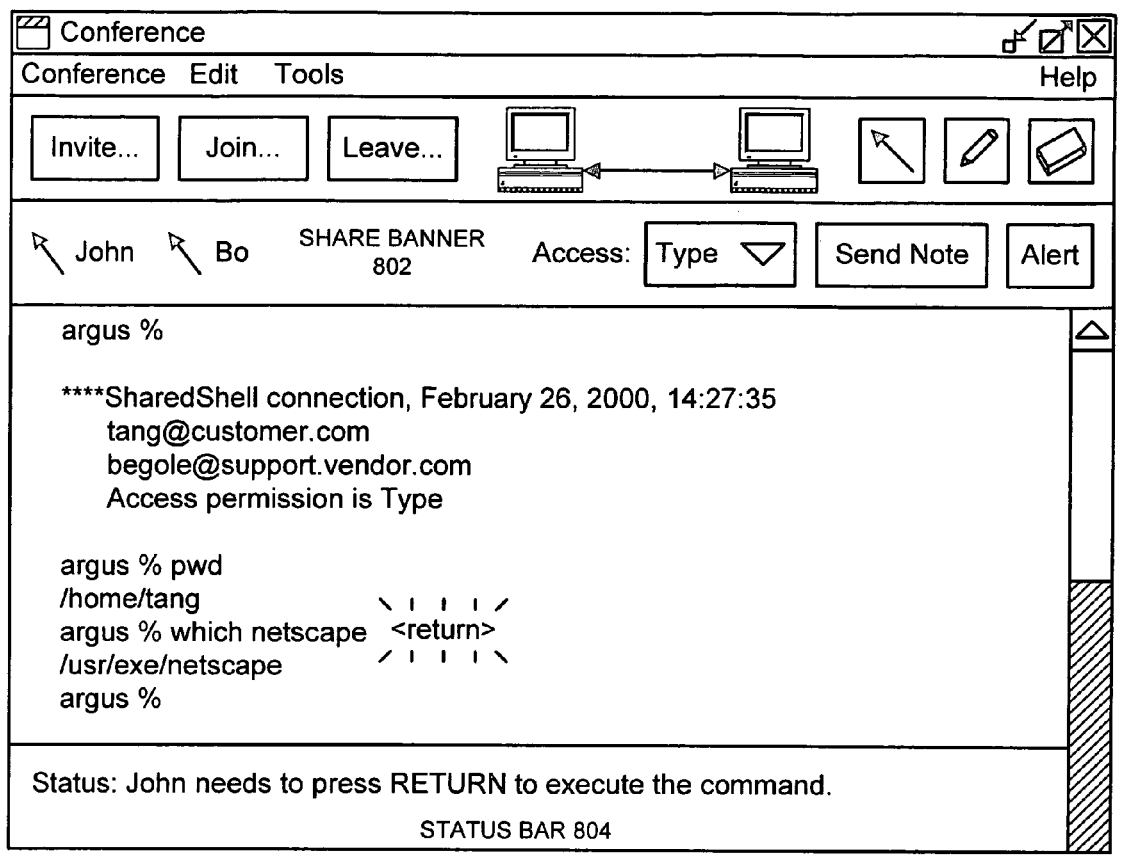
FIG. 8 illustrates a shared window for entering commands into a local computer system in accordance with an embodiment of the present invention.

FIG. 8 illustrates a shared window 106 for entering commands into a local computer system in accordance with an embodiment of the present invention. A number of changes in shared window 106 indicate to the participants that the window is shared. In shared window 106 itself, a message appears indicating the time of the connection, the list of participants (in their appropriate colors), and the access permission setting for the conference. Throughout the conference, similar messages are printed in shared window 106 when: a new participant joins the conference; a participant leaves the conference; access permissions are changed; a user changes his or her color; or a window is cloned (as is explained below).

In the toolbar area of shared window 106, the status indicator changes to show that shared window 106 is connected to at least one other user.

Furthermore, a "share banner" 802 in a bright color such as yellow is displayed to act as a conspicuous visual reminder that shared window 106 is being shared. This share banner 802 contains all the functions related to sharing. On the left side of share banner 802 is a legend with the names of each participant. The arrow by each name indicates the user's color for the current conference. To the right of the legend is an "access" menu that reflects the current access permissions setting. This menu can be used during a conference to change the current access permissions. Further right in the share banner 802 is a button to send a note to one or more conference participants.

Pressing the "send note" button brings up a small note window. Sending a note is useful when the user wants to send a text message to another participant, but doesn't want it executed as a command in the terminal (e.g., sending a Web uniform resource locator (URL)). By default, notes are sent to all participants in a conference, but a pull-down menu can be used to select a single user to send a private note to when there are more than two conference participants. When a note is received, an alert bell rings and the note pops up on the recipient's computer screen.

Any URLs included in notes are live; clicking on a URL will open the user's default web browser to the specified web page. In addition, the recipient of a note may send a reply, either to the sender or to all conference participants. The last item in the share banner 802 is an "Alert" button. This is used to get the attention of remote participants (typically by playing a sound on everyone's computer).

In most respects, shared window 106 acts like any standard terminal window. The user types commands at the prompt and output is printed in shared window 106. One unique feature about shared window 106 is that more than one user may type commands if access permissions are set to either "type" or "execute." Under these circumstances, the typing appears in the color associated with the person typing, as indicated in the legend. The system prompt always appears in black, and the default color for the conference initiator (the local user, in our scenario) is also black (although this color can be changed in the "user preferences" dialog box). The output of any command appears in the color of the person who typed the carriage return that executed the command. If shared window 106 is in "type" mode, only the user who initiated the conference, who is operating the computer on which any commands would be executed, can execute a command by pressing the "return" key at the end of the command line. In one embodiment of the present invention, this means that only the local user can execute commands by pressing "return." If the remote user types a command and presses "return," a blinking "<RETURN>" appears on shared window 106, indicating that execution of the command is pending confirmation by the local user, who must press "return." As soon as the local user presses "return," the blinking pending <RETURN> indicator disappears and the command is executed. Any user can cancel the command by pressing ctrl-C, or can edit it using the "backspace" key. If the command is cancelled, any user can add to the command or edit the command through keyboard input.

In "execute" mode, any participant may press "return" to execute commands. In one embodiment, this allows the remote user to execute commands without having to wait for the local user to confirm them. The color of the output of each command is determined by who pressed "return" to execute that command.

The access permission setting can be changed in the midst of a conference. Hence, as the local user gains more of a sense of trust in the remote user, he can change the access permission to "execute" using a drop-down menu in share banner 802. A message documenting the change is printed in shared window 106, and the remote user can now type commands directly into shared window 106 on her own.

Another unique aspect of shared window 106 is that it doubles as a shared drawing surface. Regardless of access mode, any user in a shared window conference may gesture or draw at any time using the drawing tools. The drawing tools are available from the toolbar, the tools menu, or the draw tools palette.

When the pointer tool is selected (the default selection), the user's cursor is in the shape of the arrow. It appears in the user's color, as indicated in the legend. Since all conference participants always see each others' cursors, they can be used as telepointers to convey mouse movements for pointing and gesturing. Typing at the keyboard will enter the text at the command-line prompt, and selecting and dragging with the left mouse button down will select text within shared window 106.

When the marker tool is selected, the user's cursor changes shape to that of the marker and the user draws in the terminal window in his or her selected color when the left mouse button is pressed. The annotation layer 204 on which the drawing appears is translucent so that terminal text can still be read if a user draws over it, or if new commands produce output that is printed in a place where a drawing already exists. Typing at the keyboard still enters text at the command-line prompt.

Note that when shared window 106 scrolls, the drawing stays synchronized with the text and scrolls off the screen along with the text.

Selecting the eraser tool allows any user to erase a portion of the drawing and changes the user's cursor to the shape of an eraser. The user may erase both their own drawings and those of anyone else in the conference. Typing at the keyboard will still enter text at the command-line prompt.

While troubleshooting a problem using a shared window conference, it may be necessary to add users to the conference, or some users may wish to drop out. For example, as the users work through the problem, suppose the remote user decides to add a colleague who is known to be an expert on this particular problem. First, the remote user adds the expert to the telephone conference call. Then, the remote user instructs the local user to go through the invitation process again to invite the expert to join the shared window conference. The process of inviting new members to the conference is controlled by the person who initiated the conference since any commands executed in shared window 106 will be executed on that person's machine. The local user reviews the access permissions and decides to change it to "type" mode before pressing "invite." The conference ID dialog box from FIG. 6 reappears and the process continues in the same way as initially starting the conference (by reading the new conference ID out loud and confirming the new participant that is joining). Once the expert is connected to the existing conference, all participants may all point, draw, scroll back to see previous contents of the window, or type commands.

While troubleshooting, it is often handy to have more than one terminal window open at a time. At any time during a shared window conference, any participant may select "clone window" from the conference menu. This opens an additional shared window connected to the same computer with all the same access permissions and the same participants. A message saying that the window was cloned is printed in the transcript.

To drop out of a conference, any user may click on the "leave . . . " button, select "leave . . . " from the conference menu, or click the close box from the window manager. For example, suppose once the remote user explains the problem to the expert, she realizes that she can leave the conference and move on to her next customer. When she clicks on "Leave . . . ", she is prompted with a confirmation of whether she wants to leave or wants to leave and quit shared window 106. If she chooses only to leave, a message is printed in the terminal documenting the time when the remote user left the conference. The remote copy of shared window 106 on her computer now turns into an inactive, unconnected terminal, as reflected in the status indicator.

The transcript from the conference still appears in the window and may be viewed, scrolled, copied, and saved, but there is no longer an active prompt (i.e., no commands can be entered because shared window 106 is no longer logged in to any computer) and share banner 802 disappears.

When the remote user leaves, her name disappears from the legend in the shared windows on the local user's computer and on the expert's computer, both of whom are still in the shared window conference.

Suppose that after working through the problem, the expert resolves the issue and instructs the local user to leave the shared window conference. When the local user selects the "leave . . . " command, the system behaves slightly different than when the remote user left. A dialog box warns remaining remote users that when the local user leaves the shared window conference will end for everyone. If the local user confirms that he wants to leave, he is left with an active but disconnected shared window 106. The share bar disappears and the status indicator shows that the window is no longer connected to anyone else.

The window still contains the history of interaction from the just-completed conference. The local user may continue to work in this terminal and can even connect to other users at some later time.

At any time during a shared window conference, a user may decide to save a copy of the transcript. This saves both the text and any drawing in a file. Selecting the "save transcript . . . " command from the conference menu brings up a dialog box prompting the user to enter a file name. The user is also given the option to save any notes that have been sent or received as part of the shared window conference. Including the notes captures all the interactions that occurred during the conference.

One embodiment of the present invention works by creating a secure connection through firewalls. To create this type of connection, it is necessary for each user's client to connect to a shared window server in "neutral" territory outside of any firewall. Proxies are needed to get through the user's firewall, and all of these networking properties need to be specified. The system tries to automatically detect and set these properties, so that users do not have to worry about configuring their shared window to run.

Note that one embodiment of the present invention additionally allows local users to globally disallow execute and/or type access for their entire company by filtering at the server.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer implemented method for providing a shared window for entering commands into a local computer system, wherein the shared window can be shared with a remote user who can input data into the shared window from a remote computer system subject to access control, the method comprising:

receiving a command from the remote user on the remote computer system at run time, wherein the command is in the form of an action applied to a graphical user interface;

wherein the command is directed toward the local computer system in order to operate the local computer system;

passing the command through a filtering process;

if the command passes the filtering process, executing the command on the local computer system;

displaying the command on the shared window on the local computer system so that a local user can view the command;

allowing the command to be displayed on a remote copy of the shared window on the remote computer system, so that the remote user can view the command;

allowing a user of the local computer system to edit and complete the command received from the remote user at run time; and if the user of the local computer completes the command, allowing the command to execute on the local computer system;

otherwise, not allowing the command to execute on the local computer.

2. The computer implemented method of claim 1, wherein if the shared window is in an approval mode, the filtering process involves:

allowing the local user of the local computer system to approve the command; and if the local user approves the command, allowing the command to pass the filtering process.

3. The computer implemented method of claim 1, further comprising if the shared window is in a view-only mode, allowing no commands received from the remote user to pass the filtering process.

4. The computer implemented method of claim 1, further comprising if the shared window is in an execute mode, allowing all commands received from the remote user to pass the filtering process.

5. The computer implemented method of claim 1, further comprising if the shared window is in a safe command mode, allowing commands from a pre-specified list of safe commands to pass the filtering process.

6. The computer implemented method of claim 5, further comprising, if the shared window is in a safe command mode and the command is not from the pre-specified list of safe commands:

allowing the local user of the local computer system to approve the command; and if the local user approves the command, allowing the command to pass the filtering process.

7. The computer implemented method of claim 1, wherein commands from different users appear in different colors on the shared window.

8. The computer implemented method of claim 1, wherein allowing the command to be displayed on the remote copy of the shared window on the remote computer system involves sending an update for the shared window from the local computer system to the remote computer system, wherein the update includes the command.

9. The computer implemented method of claim 1, further comprising receiving a second command from a second remote user on a second remote computer system.

10. The computer implemented method of claim 1, wherein the filtering process takes place on at least one of:
the remote computer system;
the local computer system; and
a shared server that is separate from the remote computer system and the local computer system.

11. The computer implemented method of claim 1, wherein the command is in the form of character input.

12. A computer-readable storage medium storing instructions that when executed by a computer cause the computer to perform a method for providing a shared window for entering commands into a local computer system, wherein the shared window can be shared with a remote user who can input data into the shared window from a remote computer system subject to access control, the method comprising:

receiving a command from the remote user on the remote computer system at run time, wherein the command is in the form of an action applied to a graphical user interface;

wherein the command is directed toward the local computer system in order to operate the local computer system;

passing the command through a filtering process;

if the command passes the filtering process, executing the command on the local computer system;

displaying the command on the shared window on the local computer system so that a local user can view the command;

allowing the command to be displayed on a remote copy of the shared window on the remote computer system, so that the remote user can view the command;

allowing a user of the local computer system to edit and complete the command received from the remote user at run time; and if the user of the local computer completes the command, allowing the command to execute on the local computer system;

otherwise, not allowing the command to execute on the local computer.

13. The computer-readable storage medium of claim 12, wherein if the shared window is in an approval mode, the filtering process involves:

allowing the local user of the local computer system to approve the command; and if the local user approves the command, allowing the command to pass the filtering process.

14. The computer-readable storage medium of claim 12, wherein if the shared window is in a view-only mode, no commands received from the remote user are allowed to pass the filtering process.

15. The computer-readable storage medium of claim 12, wherein if the shared window is in an execute mode, all commands received from the remote user are allowed to pass the filtering process.

16. The computer-readable storage medium of claim 12, wherein if the shared window is in a safe command mode, commands from a pre-specified list of safe commands are allowed to pass the filtering process.

17. The computer-readable storage medium of claim 16, wherein if the shared window is in a safe command mode and the command is not from the pre-specified list of safe commands, the method further comprises:

allowing the local user of the local computer system to approve the command; and if the local user approves the command, allowing the command to pass the filtering process.

18. The computer-readable storage medium of claim 12, wherein commands from different users appear in different colors on the shared window.

19. The computer-readable storage medium of claim 12, wherein allowing the command to be displayed on the remote copy of the shared window on the remote computer system involves sending an update for the shared window from the local computer system to the remote computer system, wherein the update includes the command.

20. The computer-readable storage medium of claim 12, wherein the method further comprises receiving a second command from a second remote user on a second remote computer system.

21. The computer-readable storage medium of claim 12, wherein the filtering process takes place on at least one of:
   the remote computer system;
   the local computer system; and
   a shared server that is separate from the remote computer system and the local computer system.

22. The computer-readable storage medium of claim 12, wherein the command is in the form of character input.

23. An apparatus that provides a shared window for entering commands into a local computer system, wherein the shared window can be shared with a remote user who can input data into the shared window from a remote computer system subject to access control, the apparatus comprising:
   a receiving mechanism that is configured to receive a command from the remote user on the remote computer system at run time, wherein the command is in the form of an action applied to a graphical user interface;
   wherein the command is directed toward the local computer system in order to operate the local computer system;
   a filtering mechanism that is configured to pass the command through a filtering process, and to execute the command on the local computer system if the command passes the filtering process;
   a display mechanism that is configured to display the command on the shared window on the local computer system so that a local user can view the command;
   wherein the display mechanism is configured to allow the command to be displayed on a remote copy of the shared window on the remote computer system, so that the remote user can view the command;
   wherein the filtering mechanism is further configured to allow a user of the local computer system to edit and complete the command received from the remote user at run time;
   wherein the filtering mechanism is further configured to allow the command to execute on the local computer system if the user of the local computer completes the command; and
   wherein the filtering mechanism is further configured to not allow the command to execute on the local computer system if the user of the local computer does not approve the command.

24. The apparatus of claim 23, wherein if the shared window is in an approval mode, the filtering mechanism is configured to:
   allow the local user of the local computer system to approve the command; and to
   allow the command to pass the filtering process if the local user approves the command.

25. The apparatus of claim 23, wherein if the shared window is in a view-only mode, no commands received from the remote user are allowed to pass the filtering process.

26. The apparatus of claim 23, wherein if the shared window is in an execute mode, all commands received from the remote user are allowed to pass the filtering process.

27. The apparatus of claim 23, wherein if the shared window is in a safe command mode, commands from a pre-specified list of safe commands are allowed to pass the filtering process.

28. The apparatus of claim 27, wherein if the shared window is in a safe command mode and the command is not from the pre-specified list of safe commands, the filtering mechanism is configured to:
   allow the local user of the local computer system to approve the command; and
   allow the command to pass the filtering process if the local user approves the command.

29. The apparatus of claim 23, wherein the display mechanism is configured to display commands from different users in different colors on the shared window.

30. The apparatus of claim 23, wherein the display mechanism is configured to send an update for the shared window from the local computer system to the remote computer system, wherein the update includes the command.

31. The apparatus of claim 23, wherein the receiving mechanism is configured to receive a second command from a second remote user on a second remote computer system.

32. The apparatus of claim 23, wherein the filtering mechanism is located on at least one of:
   the remote computer system;
   the local computer system; and
   a shared server that is separate from the remote computer system and the local computer system.

33. The apparatus of claim 23, wherein the command is in the form of character input.

* * * * *